United States Patent [19]
Asagi et al.

[11] Patent Number: 6,011,118
[45] Date of Patent: Jan. 4, 2000

[54] FLUORORESIN SHEET, PROCESS FOR PRODUCING THE SAME, AND THE USE OF SAME

[75] Inventors: Kosaku Asagi; Toshiharu Yamabayashi, both of Tsukuba Ibaraki, Japan

[73] Assignee: Akzo Nobel nv, Arnhem, Netherlands

[21] Appl. No.: 09/016,539

[22] Filed: Jan. 30, 1998

Related U.S. Application Data

[63] Continuation of application No. PCT/EP96/03496, Aug. 5, 1996.

[30] Foreign Application Priority Data

Aug. 3, 1995 [JP] Japan ................................ 7-198350

[51] Int. Cl.⁷ ........................ C08L 77/00; C08G 73/10; D21F 11/00; B32B 27/00
[52] U.S. Cl. ........................ 525/178; 525/191; 525/282; 528/170; 528/174; 528/310; 528/322; 528/329.1; 428/357; 428/395; 428/411.1; 264/184; 264/183; 162/157.3
[58] Field of Search .......................... 525/282, 178, 525/191; 162/157.3; 264/183, 184; 528/170, 174, 322, 329.1, 310; 428/357, 395, 411.1

[56] References Cited

U.S. PATENT DOCUMENTS

| | | | |
|---|---|---|---|
| 4,693,928 | 9/1987 | Foss | 428/236 |
| 5,324,811 | 6/1994 | You et al. | 528/489 |
| 5,767,228 | 6/1998 | Kim et al. | 528/329.1 |

FOREIGN PATENT DOCUMENTS

| | | | |
|---|---|---|---|
| 32744 | 7/1981 | European Pat. Off. | B01D 39/16 |
| 148753 | 7/1985 | European Pat. Off. | C08F 114/26 |
| 382175 | 8/1990 | European Pat. Off. | D06N 3/04 |
| WO 93/06156 | 4/1993 | WIPO | C08J 5/04 |

OTHER PUBLICATIONS

Derwent Patent Abstract 92–092890/12 (1992).

Derwent Patent Abstract 93–191633/24 (1993).

*Primary Examiner*—P. Hampton-Hightower
*Attorney, Agent, or Firm*—Richard F. Fennelly

[57] ABSTRACT

A fluororesin sheet is disclosed which comprises an aromatic polyamide pulp and a fluororesin as an essential component, the tensile strength of the fluororesin sheet being not less than about 250 kg/cm². A process for producing this fluororesin sheet comprises dispersing the aromatic polyamide pulp and the fluororesin powder in water, adding a coagulating agent which destabilizes the dispersing of the fluororesin powder to the dispersion to deposit the fluororesin powder on the surface of the aromatic polyamide pulp, paper-making, followed by drying to obtain a sheet article, and compressing the sheet article using a roller, followed by heating.

11 Claims, No Drawings

FLUORORESIN SHEET, PROCESS FOR PRODUCING THE SAME, AND THE USE OF SAME

The present application is a Continuation of International Application No. PCT/EP96/03496 filed Aug. 5, 1996.

BACKGROUND OF THE INVENTION

The present invention relates to a sheet which is useful for various packings, bearings, thrust washers, etc., a process for producing the same, and the use of same. More particularly, the invention relates to a fluororesin sheet comprising an aromatic polyamide pulp and a fluororesin, as an essential component, the fluororesin sheet having excellent mechanical characteristics, friction and wear characteristics, heat resistance and chemical resistance, to a process for producing the same, and to a sliding material comprising the fluororesin sheet.

Because of its excellent friction and wear characteristics, heat resistance and chemical resistance, fluororesin is widely used as a sliding material for various packings, bearings, thrust washers, etc. However, fluororesin alone is liable to be deformed by external force, and the wear loss is high. Therefore, various reinforcing fillers have been formulated to correct these drawbacks.

For the above applications such as packing, thrust washer, etc., thin-sheet sliding material is required. However, it tends to be difficult to melt the fluororesin or dissolve it in a solvent. Therefore, it is impossible to use the sheet forming processes such as casting, blow moulding, etc., which are normally used in thermoplastic resins such as nylon, polyethylene, etc.

Accordingly, what tends to be used is a so-called skiving process comprising the subjecting of a cylindrical block to compression moulding and heating and skiving the resulting sheet to obtain a thin sheet. However, this process gives inferior productivity and, therefore, an economical process for producing a sheet article is needed which also provides high productivity.

Characteristics such as hardness, wear performance, etc., can be improved by further adding fibrous fillers (e.g., glass fiber, etc.) and particulate fillers (e.g., bronze powder, etc.), but the mechanical performance (e.g., tensile strength, etc.) cannot be improved because fluororesin's adhesion is inferior to that of the filler.

In order to improve this, the present inventors have suggested a resin composition for sliding material in which use is made of a highly-fibrillated aromatic polyamide pulp in combination with fluororesin powder (Japanese Patent Kokai (laid-open) No. 5-117476). Since the highly-fibrillated aromatic polyamide pulp is used as a reinforcement in this composition, the fluororesin is reinforced by physical interlocking of the aromatic polyamide pulp, which gives a strong reinforcing effect. However, also in this case a sufficiently strong reinforcing effect is obtained only in the block state.

In addition, a sheet produced from this block according to the skiving process has high anisotropy, and it is difficult to obtain sufficient tensile strength in all directions of the sheet surface. Therefore, materials having a tensile strength of not less than about 250 kg/cm$^2$ in all directions of the sheet surface have never been obtained. The reason for this is considered to be that the fibers are mainly oriented in the direction perpendicular to the compressing direction at the time of press moulding of the block and scarcely in the compressing direction itself.

In Japanese Patent Kokoku No. 4-36181 is disclosed a process of depositing a tetrafluoroethylene resin polymer (PTFE) on a fiber sheet to give a sheet. In this process, however, chopped fibers made simply by cutting up long fibers are used as reinforcing fibers instead of the pulp and, therefore, a special mixer is required for the dispersion. In addition, a mixed solution of water and isopropanol is used as a dispersant, so there is a drainage treatment problem and normal paper-making processes using only water as the dispersant cannot be applied.

In Japanese Patent Kohyo No. 6-511029 is disclosed a process for producing a composite material which comprises bringing a mat obtained from a fiber material into contact with an aqueous dispersant of a fluoropolymer to precipitate the fluoropolymer onto the mat.

On the other hand, if a cut fiber is used without first making a fibrous mat, a problem is caused in that the rate of deposition of the fluororesin onto the cut fiber is too low.

As described above, there has never been a conventional technique for producing a sheet comprising an aromatic polyamide pulp as reinforcement and a fluororesin as matrix, with the sheet having sufficient tensile strength and the process having excellent productivity. Therefore, such a process is urgently needed.

DESCRIPTION OF THE INVENTION

An object of the present invention is to provide a sheet comprising an aromatic polyamide pulp and a fluororesin as an essential component, the sheet having excellent mechanical characteristics and friction and wear characteristics, a process for producing the same, and the use thereof as a sliding material.

In other words, the present invention provides a fluororesin sheet comprising an aromatic polyamide pulp and a fluororesin as a main component, the tensile strength of the fluororesin sheet being not less than about 250 kg/cm$^2$.

The present invention also provides a process for producing a fluororesin sheet comprising an aromatic polyamide pulp and a fluororesin as a main component, which process comprises the steps of:

(1) preparing a dispersion in which the aromatic polyamide pulp and the fluororesin powder are dispersed in water;

(2) adding a coagulating agent (flocculent) to the dispersion to deposit the fluororesin powder on the surface of the aromatic polyamide pulp;

(3) subjecting the aromatic polyamide pulp on which the fluororesin has been deposited to paper making, followed by drying to obtain a sheet article; and (4) compressing the sheet article, followed by heating (sintering).

The present invention also provides a sliding material comprising a fluororesin sheet comprising an aromatic polyamide pulp and a fluororesin as a main component, the tensile strength of the fluororesin sheet being not less than about 250 kg/cm$^2$.

The invention also provides a composite molded material which is a laminate of composite sheets as described above, the composite molded material having a tensile strength of not less than about 250 kgf/cm$^2$.

Accordingly, the invention also pertains to a process for producing such a composite molded material, comprising making a sheet material as described above, and laminating a plurality of such sheet-like materials, followed by sintering. The present invention also provides a sliding material of the above composite molded material.

DESCRIPTION OF THE PREFERRED EMBODIMENTS

The present invention will be explained in detail below.

The aromatic polyamide resin which is the raw material of the aromatic polyamide pulp to be used in the present invention is one in which at least about 85 mole % of its amide bonds are obtained from aromatic diamine and aromatic dicarboxylic acid components.

Examples thereof include polyparaphenylene terephthalamide, polymeta-phenylene terephthalamide, polyparabenzamide, poly-4, 4'-diamino-benzanilide, polyparaphenylene-2,6-naphthalic amide, copolyparaphenylene/4,4'-(3,3'-dimethylbiphenylene) terephthalamide, copolyparaphenylene/2,5-pyridylene terephthalamide, polyorthophenylene phthalamide, polymetaphenylene phthalamide, polyparaphenylene phthalamide, polyorthophenylene isophthalamide, polymetaphenylene isophthalamide, polyparaphenylene isophthalamide, polyorthophenylene terephthalamide, poly-1,5-naphthalene phthalamide, poly-4,4'-diphenylene orthophthalamide, poly-4,4'-diphenylene isophthalamide, poly-1,4-naphthalene phthalamide, poly-1,5-naphthalene isophthalamide, etc.; and aromatic polyamides containing an alicyclic amine, represented by compounds obtained by substituting a part of the benzene ring of these aromatic diamines with piperazine, 1,5-dimethyl piperazine, 2,5-diethyl piperazine, etc.; or copolymers of aromatic polyamides containing two phenyl groups, wherein aromatic diamines are bonded with ether bonds (e.g. 8,3'-oxydiphenylene diamine, 3,4-oxydiphenylene diamine, etc.) and groups (e.g., —S—, $SO_2$—, —CO—, —NH—, etc.), such as poly-8,8'-oxydiphenylene terephthalamide/polyparaphenylene terephthalamide copolymer, poly-3,4-oxydiphenylene terephthalamide/polyparaphenylene terephthalamide copolymer, etc.

The aromatic polyamide pulp to be used in the present invention can be obtained by highly fibrillating the fibers of the above aromatic polyamide resin. A BET specific surface area is often used as an index of the fibrillation. The value of the BET surface area of the aromatic polyamide pulp which is suitable for the process of the present invention is about 3 to about 25 $m^2/g$, preferably about 5 to about 20 $m^2/g$, more preferably about 9 to about 16 $m^2/g$. When the value of the BET specific surface area of the pulp is too low, there is insufficient interlocking of the pulps and a sheet having high mechanical strength is not obtained. In addition, it becomes difficult to deposit fluororesin particles on the pulp. On the other hand, when the value of the specific surface area is too high, the freeness necessarily becomes inferior and hence more time is required for paper-making, resulting in lower efficiency.

Examples of the fluororesin to be used in the present invention include tetrafluoroethylene resin (hereinafter also referred to sometimes as "PTFE"), perfluoro-alkoxy resin (hereinafter also referred to sometimes as "PFA"), tetrafluoroethylene-hexafluoropropylene copolymer resin (hereinafter also referred to sometimes as "FEP"), tetrafluoroethylene-ethylene copolymer resin (hereinafter also referred to sometimes as "ETFE"), vinylidene fluoride resin (hereinafter also referred to sometimes as "PVDF"), chlorotrifluoroethylene resin (hereinafter also referred to sometimes as "PCTFE"), etc. Among these, PTTE is particularly preferred in view of its heat resistance, sliding characteristics, etc.

The average particle size of the fluororesin powder is preferably about 0.01 to about 10 $\mu$m, more preferably about 0.1 to about 1 $\mu$m. When the particle size is too small, it becomes difficult to deposit particles on the fiber surface. On the other hand, when the particle size is too large, it becomes difficult to obtain a stable dispersion. In addition, it becomes difficult to disperse the resin uniformly in the sheet.

The formulation proportion of aromatic polyamide pulp to fluororesin powder is appropriately selected according to the desired final product, and it is preferred that the weight ratio of aromatic polyamide pulp to fluororesin is within a range of about 10:90 to about 70:30.

In the first step of the production process of the present invention, a dispersion in which the above polyamide pulp and fluororesin powder are dispersed in water is prepared. The preparation process of the dispersion is not specifically limited, for example: a process can be used which comprises preparing a dispersion by first dispersing fluororesin powder in water and then dispersing the fluororesin powder dispersion and an aromatic polyamide pulp in water; a process which comprises first preparing a dispersion in which fluororesin powder is dispersed in water and then dispersing an aromatic polyamide pulp in the dispersion of the fluororesin powder in water; a process of dispersing fluororesin powder and an aromatic polyamide pulp in water, etc. Hereinafter, a preferred process of preparing the dispersion will be specifically explained.

Fluororesin powder is stably dispersed in water containing an anionic, cationic or nonionic surfactant to prepare a fluororesin dispersion (hereinafter also referred to sometimes as a fluororesin dispersion or emulsion). It is also possible to prepare the same dispersion of the fluororesin powder by subjecting a monomer as the raw material of the fluororesin to aqueous polymerization in the presence of one or more types of the above surfactants.

It is also possible to use a commercially available water dispersion of fluororesin powder. Examples of the water dispersion of fluororesin powder include fluororesin dispersions of fluororesin powders which are commercially available from Asahi Glass Co., Ltd. and Daikin Kogyo Co., Ltd.

Then, the dispersions of the fluororesin powder and the aromatic polyamide pulp are dispersed in water. A process can be used as the dispersing process which has been hitherto used for wood pulp paper-making. For example, the dispersion can be prepared by using various pulpers, various beaters (e.g., a Niagara beater, etc.) or various refiners (e.g., a single disc refiner, etc.). The concentration of aromatic polyamide pulp and fluororesin powder in the dispersion can be freely selected, but it is preferred to select the concentration as high as possible unless the fluidity of the dispersion reduces economical efficiency.

The formulation proportion of aromatic polyamide pulp to fluororesin powder in the dispersion is decided by the composition ratio of aromatic polyamide pulp to fluororesin of the final product, but is preferably within a range of about 10:90 to about 70:30 (weight ratio).

When the proportion of aromatic polyamide pulp is too small, a sufficient reinforcing effect cannot be obtained. On the other hand, when the proportion is too large, a sheet having sufficient mechanical strength and friction and wear characteristics cannot be obtained. Furthermore, fillers (e.g., graphite, bronze powder, etc.), additives or other components can be added to the dispersion for the purpose of improving the performance of the sheet and imparting other characteristics, unless the homogeneity of the dispersion is reduced.

Then, a coagulating agent which destabilizes the dispersing of fluororesin particles is added to this dispersion of aromatic polyamide pulp and fluororesin powder to deposit particles of the fluororesin powder on the surface of the aromatic polyamide pulp. The kind and amount of coagulating agent to be added is decided by the kind of the surfactant used for dispersing the fluororesin powder and the specific surface area of the aromatic polyamide pulp.

When the fluororesin powder is stabilized by the anionic surfactant, coagulating agents (e.g., a strong acid, strong electrolyte, etc.) or polymer coagulating agents (e.g., a polyacrylamide, sodium polyacrylate, etc.) can be used and, furthermore, these polymer coagulating agents can be used in combination with strong acid or strong electrolyte.

When the particles of the fluororesin are stabilized by the cationic surfactant, coagulating agents (e.g., base, strong electrolyte, etc.) or polymer coagulating agents (e.g., polyacrylamide, polymethacrylate, etc.) can be used and, furthermore, these polymer coagulating agents can be used in combination with base or strong electrolyte.

When the particles of the fluororesin are stabilized by the nonionic surfactant, coagulating agents (e.g., strong electrolyte, etc.) or polymer coagulating agents (e.g., polyacrylamide, etc.) can be used and, furthermore, these polymer coagulating agents can be used in combination with strong electrolyte.

In addition, it is particularly preferred to use tannic acid in combination with an electrolyte containing a polyhydric metal ion (e.g., aluminum sulfate, etc.) as the coagulating agent irrespective of the kind of surfactant used. At this time, it is effective for depositing substantially about 100% of the fluororesin powder on the aromatic polyamide pulp to adjust the pH of the system within a range of about 3.5 to about 6.0 by adding an alkaline component (e.g., potassium hydroxide, ammonia, etc.).

In the present invention, it is particularly important to select an optimum combination of aromatic polyamide pulp, fluororesin dispersion, and coagulating agent, paying attention to the following:

The fluororesin powder in the dispersion should be deposited on the surface of the aromatic polyamide pulp as much as possible, preferably substantially about 100%. This is important in view of getting effective use out of an expensive fluororesin raw material. In the case of a fluororesin which is scarcely deposited (100%) flowing into the drainage at the time of paper-making, the corresponding drainage treatment is required, significantly reducing economical efficiency. From this viewpoint, the term "substantially about 100%", used herein, should be understood to mean that the amount of fluororesin flowing into the drainage at the time of paper-making should be reduced to the level where no drainage treatment is required.

The destabilized fluororesin powder deposited on the surface of the aromatic polyamide pulp should be uniformly deposited on the surface of the aromatic polyamide pulp without forming a large floc.

The dispersion after depositing of the fluororesin powder should have suitable freeness. This can be evaluated by measuring the freeness of the dispersion in accordance with the method described hereinafter.

From these viewpoints, as described above, suitable aromatic polyamide pulp has a BET specific surface area of preferably about 3 to about 25 m$^2$/g, more preferably about 5 to about 20 m$^2$/g, most preferably about 9 to about 16 m$^2$/g. Suitable fluororesin powder has an average particle size of 0.01 to about 10 μm, more preferably about 0.1 to about 1 μm.

In addition, the dispersion of fluororesin powder stabilized with anionic surfactant is more easily destabilized than when it is stabilized with nonionic surfactant. Therefore, the amount of coagulating agent required for the deposition of the fluororesin powder tends to be reduced. However, a large amount of floc is liable to form, and it becomes difficult to obtain a uniform sheet.

By contrast, a dispersion stabilized with nonionic surfactant is not easily destabilized, but fine fluororesin powder is deposited on the surface of the aromatic polyamide pulp to obtain a uniform sheet. Therefore, it is preferred to use the nonionic dispersion as the raw material in the present invention.

To destabilize dispersing of the fluororesin powder, a process using a condensate of an aromatic polyhydroxy carboxylic acid and a glycol in combination with a polyvalent metal salt, and particularly tannic acid in combination with aluminum sulfate, is effective for the nonionic dispersion and is also effective for the anionic dispersion in a smaller amount than when the other coagulating agent is used, and it is most preferred.

After the dispersion destabilized with the coagulating agent has been subjected to paper-making using a conventional method, the resultant product can be optionally dehydrated and dried to obtain a sheet article. The term "paper making" used herein broadly indicates any known method of making a sheet-like material from a liquid containing a pulp in dispersed state. In the process of the present invention paper-making can be performed by applying a Fourdrinier or a cylinder-type paper-making machine.

In order to produce a fluororesin sheet according to the present invention, the sheet-like material is pressurized (compressed) to form a dense structure and thereafter, or simultaneously, it is heated (in fact, sintered) to a temperature of at least the melting point or the softening point of the fluororesin. When using PTFE having a melting point of about 320° C. as the fluororesin, the sheet according to the invention is obtained by sintering at a temperature of from about 300° C. to about 450° C., and preferably about 350° C. to about 40° C. The sintering is preferably conducted in a nitrogen atmosphere. The sheet can be compressed using a press machine or the like, but for the sake of high productivity, it is preferred to use rolls. The pressure is preferably of from about 300 to about 1500 kgf/cm$^2$ (preferably reached by gradually increasing the pressure from a normal pressure to the predetermined pressure in about two minutes).

In the same manner as with a conventional moulded article of fluororesin, the sheet obtained by pressurizing at room temperature can be calcined in an oven at a temperature above the melting point of the fluororesin according to a batch method. In addition, the sheet obtained by compressing at a temperature below the melting point of the fluororesin can also be heated by being passed through a beat roller at a temperature above the melting point of the fluororesin.

The sheet article, after drying, can be simultaneously compressed and heated by being passed directly through the heat roller at a temperature above the melting point of the fluororesin. This process is particularly preferred because of its high productivity and economical efficiency.

A preferred embodiment of step (4) of the present invention, i.e., the step of compressing the sheet article followed by heating, includes the step of compressing the sheet article at a temperature below the melting point of the fluororesin (320° C. in the case of PTFE) using a roller, and then heating the sheet article at a temperature above the melting point of the fluororesin using an oven or a heat roller; compressing the sheet article at a temperature below the fluororesin using a roller, and then heating and compressing simultaneously, at a temperature above the melting point of the fluororesin; or compressing and heating simultaneously by compressing the sheet article at a temperature above the melting point of the fluororesin using a roller.

According to the process of the present invention, a fluororesin sheet comprising aromatic polyamide pulp and fluororesin as the main component can be produced, with the tensile strength of the sheet being not less than about 250 kg/cm$^2$ when measured in any direction, in accordance with a conventional paper-making process.

In addition, the process of the present invention is an excellent process for industrial use because substantially about 100% of the fluororesin powder can be deposited on the aromatic polyamide pulp.

The fluororesin sheet of the present invention is particularly useful as a sliding material because of its excellent mechanical characteristics and friction and wear characteristics.

The following Examples further illustrate the present invention in detail, but are not to be construed as limiting the scope thereof. The measurement of the values of various physical properties in the Examples was conducted in accordance with the evaluation method described hereinafter.

Evaluation Method of Physical Properties

1. Freeness
1.1 Freeness of aromatic polyamide pulp
   The freeness of the aromatic polyamide pulp was measured according to a Canadian standard type method described in JIS P8121, "Freeness Testing Method of Pulp."
1.2. Freeness of aromatic polyamide pulp/fluororesin dispersion
   The freeness of the aromatic polyamide pulp/fluororesin dispersion after of the destabilizing fluororesin particles was measured as follows.
   (1) A dispersion to the amount containing 1.2 g of aromatic polyamide pulp was taken from the dispersion.
   (2) The dispersion was diluted to make 1 l, using a measuring cylinder.
   (3) The freeness was measured in accordance with a Canadian standard type method described in JIS P8121.
     When the value of this freeness is 200 to 600 ml, more preferably 300 to 500 ml, paper-making can be suitably carried out.
2. COD of filtrate at the time of paper-making
   The COD was measured by using a KMnO4 method at 100° C., in accordance with JIS K 0102.17.
3. Deposition rate of fluororesin
   The deposition rate of the fluororesin on the surface of the aromatic polyamide pulp was calculated from the following equation, assuming that the total amount of aromatic polyamide pulp charged remained in the sheet.
   Deposition rate of fluororesin [%]:

{(Dry weight of sheet−Charge amount of aromatic polyamide pulp)/(Charge amount of fluororesin)}×100

4. Tensile strength of sheet-shaped sliding material.
   The tensile strength of the sheet-shaped sliding material was measured under the condition of a gauge length of 40 mm and a stress rate of 100 mm/minute, using a JIS No. 3 dumbbell-shaped specimen.
5. Friction and wear performances of sheet-shaped sliding material
   The friction and wear test of the sheet-shaped sliding material was conducted by using the following test method and condition.
   Testing machine: ring-on-disc vertical type frictional wear testing machine (manufactured by Takachiho Seiki Co., Ltd.)
   Specimen: disc-shaped
   Opposite material: S55C ring-shaped
   Pressure: 6 kg/cm$^2$
   Rate: 40 m/minute
   Testing time: 4 hours
6. Critical PV value of sheet-shaped sliding material
   The critical PV value of the sheet-shaped sliding material was determined by using the following testing method and condition.
   Testing machine: ring-on-disc vertical type frictional wear testing machine (manufactured by Takachiho Seiki C., Ltd.)
   Specimen: disc-shaped
   Opposite material: S55C, ring-shaped
   Rate: 150 m/minute (constant)
The pressure was increased at intervals of 5 kg/cm$^2$ (e.g. 5, 10. 15, 20, and 25 kg/cm$^2$, etc.), and the test was conducted at each respective pressure for ten minutes, to determine the critical PV value where a friction coefficient changes rapidly or a sheet is fractured.

EXAMPLE 1 AND COMPARATIVE EXAMPLE 1

An aromatic para-polyamide pulp, TWARON 1094 brand (provided by Nippon Aramid Co., Ltd., BET specific surface area: 13.5 m$^2$/g, freeness: 100 ml) (1.0 g (dry weight)) and a nonionic dispersion of PTFE, FLUON Dispersion AD1 (manufactured by Asahi Glass Co., Ltd., average particle size of PTFE: 0.25 µm, solids content: 60% by weight) (6.67 g (solids content: 4.0 g)) were weighed and dispersed in deionized water to give 400 g of dispersion. A coagulating agent (flocculent), as described in Table 1, below, was added to the dispersion so that a desired concentration was obtained, followed by stirring for ten minutes. At that time, ammonia water was added to the dispersion to adjust the pH to 3.5 to 4.5 in Example 1. Thereafter, the dispersion was filtered off using a No. 1 filter paper, and the filtered product was dried to obtain a sheet article. Then, the sheet article was weighed to determine the deposition rate of the fluororesin powder. The results are shown in Table 1:

TABLE 1

| | Flocculant | | Concentration of aluminum sulfate (ppm) | Fluororesin Deposition rate (%) |
| --- | --- | --- | --- | --- |
| | Item | Concentration (ppm) | | |
| Example 1 | Tannic acid | 600 | 400 | 100 |
| Comparative Example 1 | None | — | 2000 | 5 |

EXAMPLES 2 to 5

An aromatic para-polyamide pulp, TWARON 1094 brand (provided by Nippon Aramid Co., Ltd. BET specific surface area: 13.5 m²/g, freeness: 100 ml) (1.0 g (dry weight)) and an anionic dispersion of PTFE FLUON Dispersion AD2 (manufactured by Asahi Glass Co., Ltd., average particle size of PTFE: 0.17 μm solids content: 55 % by weight) (7.27 g (solids content: 4.0 g)) were weighed and dispersed in deionized water to give 400 g of dispersion. A coagulating agent described in Table 2 was added to the dispersion so that a desired concentration was obtained, followed by stirring for ten minutes. Thereafter, the dispersion was filtered off using a No. 1 filter paper, and the filtered product was dried to obtain a sheet article. Then, the sheet article was weighed to determine the deposition rate of the fluororesin powder. The results are shown in Table 2. SUMIFLOC is a trademark for a polymer coagulating agent manufactured by Sumitomo Chemical Industries Co., Ltd. The results were as follows:

TABLE 2

| | Flocculant | Concentration of aluminum sulfate (ppm) | Fluororesin Deposition rate (%) |
| | Item | Concentration (ppm) | | |
|---|---|---|---|---|
| Example 2 | Tannic acid | 60 | 40 | 100 |
| Example 3 | SUMIFLOC FN-10H | 250 | 40 | 89 |
| Example 4 | SUMIFLOC FC-145 | 250 | — | 89 |
| Example 5 | SUMIFLOC FC-145 | 250 | 40 | 89 |

EXAMPLE 6

After TWARON 1094 aromatic para-polyamide pulp (absolute dry weight: 15.9 g) and FLUON Dispersion AD1 (83.3 g, solids content: 50 g) were dispersed in 2 l of deionized water, an aqueous 10% (by weight) solution of a special oil-water separating agent GLAZINE CF brand (2 g) (manufactured by Matsumoto Yushi Co., Ltd., component: tannic acid (60 parts by weight)/aluminum sulfate (40 parts by weight)) was added to adjust the concentration of tannic acid and aluminum sulfate in the system to 600 ppm and 400 ppm, respectively. The pH of the mixture was adjusted by adding calcium hydroxide powder (200 mg), followed by stirring for ten minutes to deposit the fluororesin powder on the surface of the aromatic polyamide pulp. Then, the paper-making of the dispersion was performed on a wire cloth of 250 mm square by using a rectangular sheet machine (manufactured by Kumagaya Riki Co., Ltd.), followed by dehydration and further drying to obtain a sheet article. The COD of the filtrate at the time of paper-making was 14 ppm. The deposition rate of the fluororesin powder was 100%. The sheet article was pressurized at room temperature at a linear pressure of 100 kg/cm using a roller, and then calcined in an oven at 380° C. under a nitrogen atmosphere for one hour. A sheet having a composition ratio of aromatic polyamide pulp to fluororesin of 24:76 (weight ratio) and a thickness of 0.55 mm was obtained. The tensile strength of this sheet was 420 kg/cm². The friction and wear performances of this sheet were measured. The result was a dynamic friction coefficient of 0.18 and a wear rate of $2 \times 10^{-5}$ mm/kgf/cm² km. In addition, the critical PV value was 3500 kg/cm²m/minute.

COMPARATIVE EXAMPLE 2

The dynamic friction coefficient and the wear coefficient of a PTFE sheet which was not reinforced with the aromatic polyamide pulp, measured in the same manner as in Example 6, were 0.26 and $4000 \times 10^{-5}$ mm/kgf/cm² km, respectively. In addition, the critical PV value was 1000 kg/cm².

EXAMPLE 7

After TWARON 1094 aromatic para-polyamide pulp (absolute dry weight: 13.7 g) and FLUON Dispersion AD2 (58.1 g, solids content: 32 g) were dispersed in 2 l of deionized water, an aqueous 1% (by weight) solution of a special oil-water separating agent GLAZINE CF (0.2 g) (manufactured by Matsumoto Yushi Co., Ltd., component: tannic acid (60 parts by weight)/aluminum sulfate (40 parts by weight)) was added to adjust the concentration of tannic acid and aluminum sulfate in the system to 600 ppm and 400 ppm, respectively. The mixture was stirred for ten minutes to deposit the fluororesin powder on the surface of the aromatic polyamide pulp. A dispersion to the amount containing 1.2 g of pulp was taken from the dispersion and, after diluting to make 1 l, the freeness was measured. It was 350 ml. Then, the paper-making of the remaining dispersion after dispersing (containing 12.5 g of pulp) was performed on a wire cloth of 250 mm square by using a rectangular sheet machine (manufactured by Kumagaya Riki Co., Ltd.) followed by drying to obtain a sheet article.

The COD of the filtrate at this time was 15 ppm, and the deposition rate of the fluororesin powder was 100%.

The sheet article was compressed at a linear pressure of 100 kg/cm at room temperature using a roller, and then calcined in an oven at 380° C. under a nitrogen atmosphere for one hour. A sheet having a composition ratio of aromatic polyamide pulp to fluororesin of 32:68 (weight ratio) and a thickness of 0.39 mm was obtained. The tensile strength of this sheet was 270 kg/cm².

COMPARATIVE EXAMPLE 3

After milled glass fibers MFB (weight: 12.5 g) (manufactured by Asahi Glass Co., Ltd., average fiber length: 200 μm) and FLUON dispersion AD1 (83.3 g, solids content: 50 g) were dispersed in 2 l of deionized water, an aqueous 10% (by weight) solution of a special oil-water separating agent GLAZINE CF (2 g) (manufactured by Matsumoto Yushi Co., Ltd., component: tannic acid (60 parts by weight)/aluminum sulfate (40 parts by weight)) was added to adjust the concentration of tannic acid and aluminum sulfate in the system to 600 ppm and 400 ppm, respectively. The pH of the mixture was adjusted by adding calcium hydroxide powder (200 mg), followed by stirring for ten minutes to deposit the fluororesin powder. Paper-making was performed on a wire cloth of 250 mm square by using a rectangular sheet machine (manufactured by Kumagaya Riki Co., Ltd.), followed by drying to obtain a sheet article. The weight of the sheet was 17.1 g and only 9% of charge amount of fluororesin powder remained in the sheet article. In addition, the mechanical strength of the resulting sheet was too low to allow its handling.

COMPARATIVE EXAMPLE 4

After p-aramid fibers MFB(13.7 g, average fiber length: 3 mm) and FLUON Dispersion AD1 (53.3 g, solid content: 32 g) were dispersed in 2 liter of deionized water, an aqueous solution (20 g) containing 6% by weight of tannic acid and 4% by weight of aluminum sulfate was added to adjust the concentration of tannic acid and aluminum sulfate in the system to 450 ppm and 300 ppm, respectively. The pH of the mixture was adjusted by adding an aqueous 1% ammonia solution (7.5 g), followed by stirring for ten minutes as it is to deposit the fluororesin powder. The sheet-making of the dispersion was conducted on a wire cloth of 250 mm square by using a rectangular sheet machine (manufactured by Kumagaya Riki Co., Ltd.), followed by dehydration and further drying to obtain a sheet-like material.

The weight of the sheet was 135 g and PTFE in the amount of 3.5% of the charge amount was merely remained in the sheet-like material. The tensile strength of a sheet obtained by pressurizing and sintering the sheet-like material according to the same manner as that described in Example 6 was 27 kgf/cm$^2$.

COMPARATIVE EXAMPLE 5

After TWARON 1094 aromatic para-polyamide pulp (absolute dry weight: 12.5 g) and PTFE particles [FLUON G163 (trade name)] manufactured by Asahi Glass Co., Ltd., average particle size: 0.25 μm (37.5 g), were dispersed in 2 liter of an aqueous 0.8% lauryl trimethylammonium chloride solution, an aqueous solution (15 g) containing 6% by weight of tannic acid and 4% by weight of aluminum sulfate was added to adjust the concentration of tannic acid and aluminum sulfate in the system to 450 ppm and 300 ppm, respectively. The pH of the mixture was adjusted by adding an aqueous 1% ammonia solution (3.75 g), followed by stirring for ten minutes as it is to deposit the fluororesin on the aromatic polyamide pulp. The sheet-making of the dispersion was conducted on a wire cloth of 250 mm square by using a rectangular sheet machine (manufactured by Kumagaya Rike Co., Ltd.), followed by dehydration and further drying to obtain an sheet-like material. The sheet-like material was pressurized at room temperature at a linear pressure of 189 kgf/cm using a roll, and then sintered in an oven at 380° C. under a nitrogen atmosphere for one hour to obtain a sheet-like sliding material having a composition ratio of the aromatic polyamide pulp to fluororesin of 24:76 (weight ratio) and a thickness of 0.50 mm. The tensile strength of this sheet-like sliding material was 66 kgf/cm$^2$.

COMPARATIVE EXAMPLE 6

In order to compare with the sheet of Example 6, various physical properties of a commercially available PTEE sheet containing bronze powder and NITOFLON 900B brand containing bronze powder (manufactured by Nitto Denko Co., Ltd.) were evaluated. As a result, the following results were obtained:

Tensile strength: 200 kgf/cm

Critical PV value: 2000 kg/cm$^2$m/minute)

Compression creep: 5.3%

Composite Moulded Material
Evaluation Method of Physical Properties
1. Bending test
Shape of specimen: 60×13×2.5 mm
Span: 40 mm
Crosshead speed: 1 mm/minute
Three-Point Bending
2. Frictional wear performances of moulded material
The Frictional Wear Test of the Moulded Material was Conducted Under the Following Condition.
Testing machine: Ring-on-disc vertical type frictional wear testing machine (manufactured by Takachiho Seiki Co., Ltd.)
Specimen: disc-shaped
Opposite material: S55C, ring-shaped
Pressure: 6 kgf/cm$^2$
Rate: 40 m/minute, PV=240
Testing time: 24 hours
3. Tensile strength
The Same as That in Case of the Sheet.

EXAMPLE 8

After TWARON 1094 aromatic para-polyamide pulp manufactured by Nippon Aramid Co., Ltd., BET specific surface area: 13.5 m$^2$/g, freeness: 100 ml) (15.0 g (absolute dry weight)) and FLUON Dispersion AD1 (manufactured by Asahi Glass Co., Ltd., average particle size of PTFE: 0.25 μm, solid content: 60% by weight) (74.8 g) were dispersed in 2 liter of deionized water, an aqueous solution (15 g) containing 6% by weight of tannic acid and 4% by weight of aluminum sulfate was added to adjust the concentration of tannic acid and aluminum sulfate in the system to 145 ppm and 300 ppm, respectively. The pH of the mixture was adjusted by adding an aqueous 1% ammonia solution (7.5 g), followed by stirring for ten minutes as it is to deposit the fluororesin on the surface of the aromatic polyamide pulp. The sheet-making of the dispersion was conducted on a wire cloth of 250 square mm by using a rectangular sheet machine (manufactured by Kumagaya Riki Co., Ltd.), followed by dehydration and further drying to obtain a sheet-like material.

After cutting the resultant sheet-like material into pieces of 85×75 mm, six pieces thereof were laminated. The height of a sheet obtained by laminating six pieces was about 6 mm. The laminated sheet was set in a die having an inner diameter of 85×75 mm and then pressed by pressing at room temperature (surface pressure: 1000 kgf/cm$^2$, pressing time: ten minutes) to obtain a preform. This preform was sintered by maintaining in nitrogen at 380° C. for one hour to obtain a composite moulded material having a composition ratio (weight basis) of the aromatic polyamide pulp to fluororesin of 15:75 and having a size of 85×75×2.5 mm (thickness), wherein the aromatic polyamide pulp and fluororesin are uniformly dispersed.

The evaluation for using the resulting composite moulded material as the sliding material was conducted. The tensile strength, the bending strength and the bending modulus of the composite moulded material (sliding material) were 420 kgf/cm$^2$, 6.26 kgf/mm$^2$ and 261 kgf/mm$^2$, respectively. Delamination between laminated sheets was not observed in the specimen after the bending test. The wear coefficient and frictional coefficient were 1×10 and 0.14, respectively. As a result, it has been found that the composite moulded material has good frictional wear properties as the sliding material.

EXAMPLE 9

After cutting a sheet-like material obtained according to the same manner as that described in Example 8 into pieces of 85×75 mm, six pieces thereof were laminated. The height of a sheet obtained by laminating six pieces was about 6 mm. The laminated sheet was set in a die having an inner diameter of 85×75 mm and then pressed by pressing at room temperature (surface pressure: 500 kgf/cm2, pressing time: ten minutes) to obtain a preform. This preform was sintered by maintaining in nitrogen at 380 ° C. for one hour to obtain a composite moulded material having a composition ratio (weight basis) of the aromatic polyamide pulp to fluororesin of 25:75 and having a size of 85×75×2.5 mm (thickness), wherein the aromatic polyamide pulp and fluororesin are uniformly dispersed.

The bending strength and bending modulus of he composite moulded material (sliding material) were 5.29 kgf/mm$^2$ and 218 kgf/mm$^2$, respectively. A delamination between laminated sheets was not observed in the specimen after the bending test. The wear coefficient and frictional coefficient were $1\times10^{-5}$ and 0.18, respectively. As a result, it has been found that the composite moulded material has good frictional wear characteristics as the sliding material.

COMPARATIVE EXAMPLE 7

A moulded material of an aromatic polyamide pulp and PTFE was produced as follows:

(i) A composition (60 g) of a pulp was prepared from dried TWARON 1094 brand pulp (15 g) and PTFE (FLUON G163 brand, manufactured by Asahi Glass Co., Ltd., average particle size: 25 μm (45 g)) and was stirred (stirring rate: 2000 rpm, stirring time: two minutes) using a 5 liter vertical type high-speed super mixer (manufactured by Kawata Co.) to obtain an uniform mixture.

(ii) The mixture (30 g) was charged in a die having an inner diameter of 85×75 mm and then pressed by pressing at room temperature (surface pressure: 1000 kgf/cm$^2$ pressing time: ten minutes) to obtain a preform. The height of the mixture after charging in the die was about 20 mm.

(iii) The preform was maintained at 380° C. under a normal pressure to obtain a moulded material.

The tensile strength, the bending strength and the bending modulus of the resulting moulded material were 190 kgf/cm$^2$, 3.49 kgf/mm$^2$ and 134 kgf/mm$^2$, respectively. The wear coefficient and frictional coefficient of the moulded material were $6.0\times10^{-5}$ and 0.14, respectively.

COMPARATIVE EXAMPLE 8

After TWARON 1094 brand pulp (12.5 g. absolute dry weight) and PTFE (FLUON G163 brand, manufactured by Asahi Glass Co., Ltd., average particle size: 25 μm (37.5 g)) were dispersed in 2 liters of deionized water, the mixture was stirred for ten minutes as it is to obtain a dispersion of PTEF and an aromatic polyamide pulp. The sheet-making of the dispersion was conducted on a wire cloth of 250 mm square by using a rectangular sheet machine (manufactured by Kumagaya Rike Co., Ltd.), followed by dehydration and further drying to obtain a sheet-like material.

This operation was repeated twice to obtain two pieces of sheets. After cutting the resultant sheet into pieces of 85×75 mm, seven pieces thereof were laminated. The height of a sheet obtained by laminating seven pieces was about 9 mm. The laminated sheet was set in a die having an inner diameter of 85×75 mm and then pressed at room temperature (surface pressure: 1000 kgf /cm$^2$, pressing time: ten minutes) to obtain a preform. This preform was sintered by maintaining in nitrogen at 380 ° C. for one hour. However, an uniform and good moulded material was not obtained because the aromatic polyamide pulp was not satisfactorily dispersed in PTFE.

According to the process of the present invention, a sheet can be obtained where an aromatic polyamide pulp is uniformly dispersed in a fluororesin, the sheet having excellent mechanical characteristics and an excellent friction and wear performance. A conventional paper-making process can be used for the process of the present invention, and the aromatic polyamide pulp can be uniformly dispersed in the fluororesin by using a simple device and operation. Therefore, it is industrially useful. In addition, the sheet of the present invention shows excellent characteristics when used as a sliding material.

We claim:

1. A fluororesin sheet comprising an aromatic polyamide pulp and a fluororesin as a main component, the tensile strength of the fluororesin sheet being not less than about 250 kg/cm$^2$.

2. A fluororesin sheet according to claim 1, which is obtained by subjecting an aqueous dispersion comprising an aromatic polyamide pulp component and a fluororesin component to paper making.

3. A process for producing a fluororesin sheet comprising an aromatic polyamide pulp and a fluororesin as a main component, which process comprises the steps of:

(a) preparing a dispersion in which the aromatic polyamide pulp and the fluororesin powder are dispersed in water;

(b) adding a coagulating agent to the dispersion to deposit the fluororesin powder on the surface of the aromatic polyamide pulp;

(c) subjecting the aromatic polyamide pulp on which the fluororesin has been deposited to a paper making process, followed by drying to obtain a sheet article; and (d) compressing the sheet article, followed by heating.

4. A process for producing a fluororesin sheet according to claim 3 wherein the aromatic polyamide pulp used in the above step (a) is an aromatic polyamide pulp having a BET specific surface area of from about 3 to about 25 m$^2$/g and the fluororesin powder is fluororesin powder having an average particle size of from about 0.01 to about 10 μm.

5. A process for producing a fluororesin sheet according to claim 3 or 4, wherein the above step (d) is a step of compressing the sheet article using a roller at a temperature below the melting point of the fluororesin, followed by heating at a temperature above the melting point of the fluororesin.

6. A sliding material comprising the fluororesin sheet of claim 1.

7. A composite molded material which is a laminate of a composite sheet comprising an aromatic polyamide pulp and a fluororesin as the main components, the composite molded material having a tensile strength of not less than about 250 kgf/cm$^2$.

8. A process for producing a composite molded material according to claim 7, comprising the steps of (a) preparing a dispersion in which the aromatic polyamide pulp and the fluororesin powder are dispersed in water;

(b) adding a coagulating agent to the dispersion to deposit the fluororesin powder on the surface of the aromatic polyamide pulp;

(c) subjecting the aromatic polyamide pulp on which the fluororesin has been deposited to a paper making process, followed by drying to obtain a sheet material; and (d) laminating a plurality of the sheet-like materials, followed by heating.

9. A process according to claim 8, wherein the aromatic polyamide pulp used in the above step (a) is an aromatic polyamide pulp having a BET specific surface area of from about 3 to about 25 m$^2$/g and the fluororesin powder is fluororesin powder having an average particle size of from about 0.01 to about 10 μm.

10. A process according to claim 8, wherein step (d) is conducted by first cutting a plurality of sheet into pieces having a predetermined shape, and then laminating and further compressing to prepare a preform which thereafter is heated.

11. A sliding material comprising a composite molded material according to claim 7.

* * * * *